(12) United States Patent
Chuang

(10) Patent No.: US 9,886,644 B2
(45) Date of Patent: Feb. 6, 2018

(54) IMAGE PROCESSING METHOD AND DEVICE

(71) Applicant: NOVATEK MICROELECTRONICS CORP., HsinChu (TW)

(72) Inventor: Yu-Hsing Chuang, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 193 days.

(21) Appl. No.: 14/334,647

(22) Filed: Jul. 17, 2014

(65) Prior Publication Data

US 2016/0019863 A1    Jan. 21, 2016

(51) Int. Cl.
*G06K 9/46* (2006.01)
*G09G 3/34* (2006.01)

(52) U.S. Cl.
CPC ............. *G06K 9/46* (2013.01); *G09G 3/3426* (2013.01); *G06K 2009/4666* (2013.01); *G09G 2320/066* (2013.01); *G09G 2320/0646* (2013.01); *G09G 2330/021* (2013.01); *G09G 2360/16* (2013.01)

(58) Field of Classification Search
CPC .......... G09G 5/10; G09G 3/3406; G09G 3/36; G09G 2330/021; G06K 9/46; G06K 2009/4666
See application file for complete search history.

(56) References Cited

U.S. PATENT DOCUMENTS

| | | | |
|---|---|---|---|
| 2007/0152926 A1* | 7/2007 | Kwon | G09G 3/3426 345/82 |
| 2010/0245398 A1* | 9/2010 | Amino | G09G 3/3426 345/690 |
| 2011/0157237 A1* | 6/2011 | Chen | G09G 3/3426 345/690 |

* cited by examiner

*Primary Examiner* — Sahlu Okebato
(74) *Attorney, Agent, or Firm* — Rabin & Berdo, P.C.

(57) ABSTRACT

An image processing method includes: dividing a frame into a plurality of image regions; analyzing contents of the image regions to obtain respective first regional characteristic values of the image regions; obtaining a global characteristic value according to the first regional characteristic values of the image regions; and controlling at least one of a backlight and a panel according to the first regional characteristic values and/or the global characteristic value.

28 Claims, 4 Drawing Sheets

IMAGE PROCESSING METHOD AND DEVICE

BACKGROUND

Technical Field

The disclosure relates an image processing method and device.

Description of the Related Art

A flat display, e.g., a liquid-crystal display (LCD), featuring numerous advantages such low power consumption and low radiation, have gradually become a market mainstream. In general, consumers pay attention to power saving efficiency and display quality of a flat display.

To reduce power consumption, the backlight brightness is dynamically adjusted according to image contents. For example, when a dark image is displayed, the frame quality is maintained by lowering the backlight brightness and increasing the image brightness, and vice versa when a bright image is displayed.

To enhance image display quality, the overall image brightness is increased. Therefore, there is a need for an image processing method and device that is capable of reducing power consumption and enhancing display quality.

SUMMARY OF THE DISCLOSURE

The disclosure is directed to an image processing and device. In the present disclosure, when image contents are analyzed to obtain a global characteristic value, instead of again analyzing frame contents, the regional characteristic values of a plurality of image regions are utilized.

According to an embodiment of the present disclosure, an image processing method is provided. The image processing method includes: dividing a frame into a plurality of image regions; analyzing contents of the image regions to obtain respective first regional characteristic values of the image regions; obtaining a global characteristic value according to the first regional characteristic values of the image regions; and controlling at least one of a backlight and a panel according to the first regional characteristic values and/or the global characteristic value.

According to another embodiment of the present disclosure, an image processing device is provided. The image processing device includes: an image content divider, for dividing a frame into a plurality of image regions; a regional content analyzer, for analyzing contents of the image regions to obtain respective first regional characteristic values of the image regions; and an image content analyzer, for obtaining a global characteristic value according to the first regional characteristic values of the image regions. The image processing device controls at least one of a backlight and a panel according to the first regional characteristic values and/or the global characteristic value.

The above and other aspects of the disclosure will become better understood with regard to the following detailed description of the preferred but non-limiting embodiments. The following description is made with reference to the accompanying drawings.

DETAILED DESCRIPTION OF THE DISCLOSURE

Technical terms of the disclosure are based on general definition in the technical field of the disclosure. If the disclosure describes or explains one or some terms, definition of the terms is based on the description or explanation of the disclosure. Description on the common technologies or theories is omitted if they do not involve the technical features of the disclosure. Further, shapes, sizes and ratios of the objects are exemplary for one skilled person in the art to understand the disclosure, not to limit the disclosure.

Each of the disclosed embodiments has one or more technical features. In possible implementation, one skilled person in the art would selectively implement part or all technical features of any embodiment of the disclosure or selectively combine part or all technical features of the embodiments of the disclosure.

Figure 1:
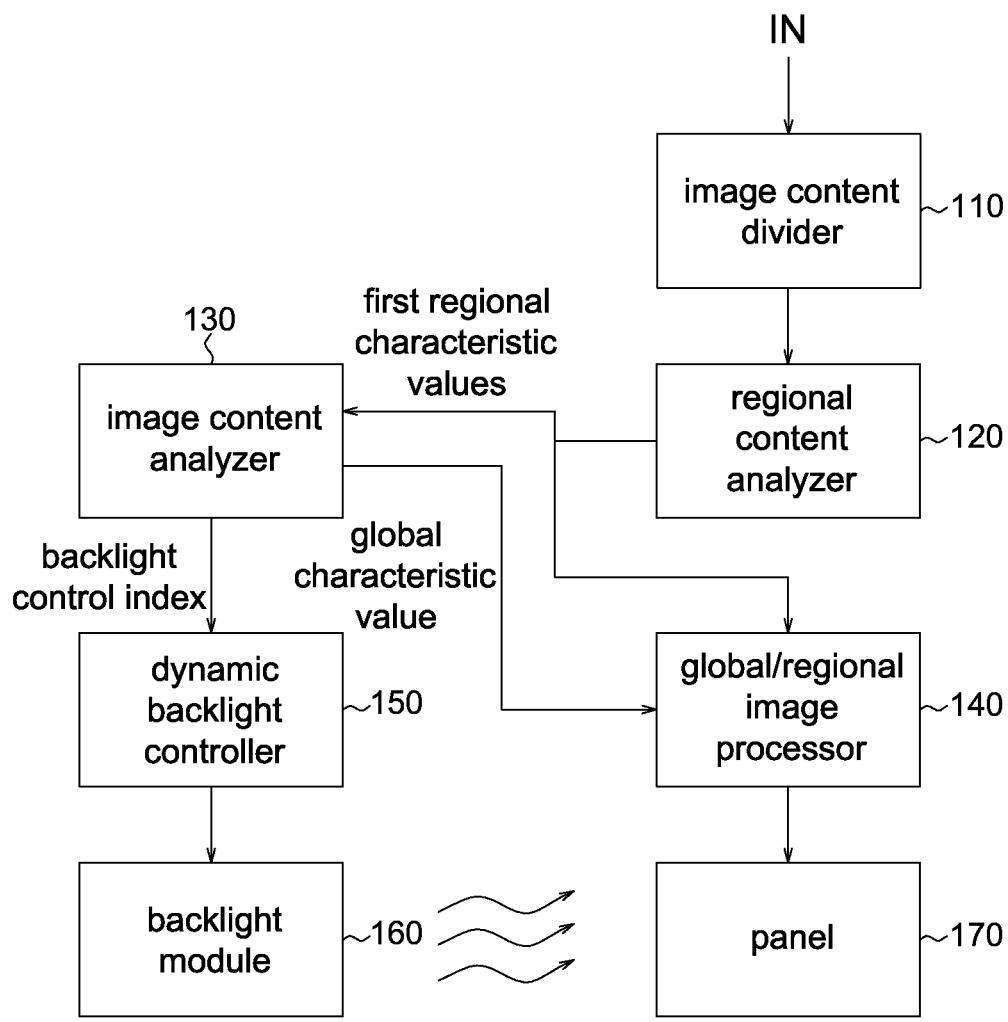
FIG. 1 is a function block diagram of an image processing device according to an embodiment of the present disclosure.

FIG. 1 shows a function block diagram of an image processing device according to an embodiment of the present disclosure. As shown in FIG. 1, an image processing device 100 includes an image content divider 110, a regional content analyzer 120, an image content analyzer 130, a global/regional image processor 140, a dynamic backlight controller 150, a backlight module 160, and a panel 170.

In the embodiment, the image content divider 110, the regional content analyzer 120, the image content analyzer 130, the global/regional image processor 140, the dynamic backlight controller 150 may be implemented by hardware or software.

The image content divider 110 divides an input frame IN into a plurality of image regions.

The regional content analyzer 120 receives the image regions divided by the image content divider 110, and analyzes the contents of the image regions to obtain respective first regional characteristic values of the image regions. The first regional characteristic values obtained by the regional content analyzer 120 are input to the image content analyzer 130 and the global/regional image processor 140.

The image content analyzer 130 obtains a global characteristic value according to the first regional characteristic values of the image regions, and sends the global characteristic value to the global/regional image processor 140. Details for obtaining the global characteristics value are described below.

The global/regional image processor 140 combines the respective first regional characteristic values with the global characteristic value to obtain a plurality of respective second regional characteristic values corresponding to the image regions. More specifically, assume that the image is divided into 100 image regions. The global/regional image processor 140 combines the first regional characteristic value corresponding to the first image region with the global characteristic value to obtain the second regional characteristic value corresponding to the first image region. The global image processor 140 combines the first regional characteristic value corresponding to the second image region with the global characteristic value to obtain the second regional characteristic value corresponding to the second image region, and so forth.

Further, the global/regional image processor 140 may perform global image processing on the input frame IN (e.g., globally adjusting the brightness of the entire input frame IN) according to the global characteristic value, and the panel 170 is controlled to display the processed frame. Further, the global/regional image processor 140 may perform regional image processing on the input frame IN according to the second regional characteristic values corresponding to the image regions. That is, image processing is performed on the image regions according to the respective second regional characteristic values, and the panel 170 is controlled to display the processed frame. For example, image processing refers to adjustment on the brightness, contrast, sharpness or saturation of the image.

In an alternative embodiment, the global/regional image processor 140 need not necessarily obtain the second regional characteristic values. When performing region image processing, the global/regional image processor 140 may perform image processing on the image regions according to the first regional characteristic values, which is also within the spirit of the present disclosure. That is to say, the computation to obtain the second characteristic values by the global/regional image processor 140 is optional.

In the embodiment, the sequence of performing the global image processing and the regional image processing is not limited. For example, the regional image processing may be performed before the global image processing, or the global image processing may be performed before the global image processing. Alternatively, the regional image processing and the global image processing may be simultaneously performed. Such variations are within the scope of the present disclosure.

The dynamic backlight controller 150 receives a backlight control index, so as to dynamically control the backlight module 160. In an embodiment of the present disclosure, when performing backlight control, the image content analyzer 130 neither receives the input frame IN nor performs global image content analysis. Further, the image content analyzer 130 obtains the global characteristic value by analyzing the image regional contents. The image content analyzer 130 further obtains a backlight control index according to the global characteristic value, and the dynamic backlight controller 150 dynamically controls the backlight module 160 according to the backlight control index. Therefore, as the first regional first characteristic values may be applied for both backlight control and image display quality enhancement, the embodiment of the present disclosure is capable of reducing the repeated computation of image content analysis to thereby save hardware resources.

In an embodiment of the present disclosure, during an image processing operation, the backlight brightness control may be performed but the image processing is not performed. Alternatively, the image processing may be performed but the backlight brightness control is not performed. Alternatively, both of the backlight brightness control and the image processing may be performed.

Two exemplary methods for obtaining the first regional characteristic values, the global characteristic value and the second regional characteristic values are described below. It should be noted that the two methods are examples for explaining the present disclosure, not limiting the present disclosure.

Figure 2:
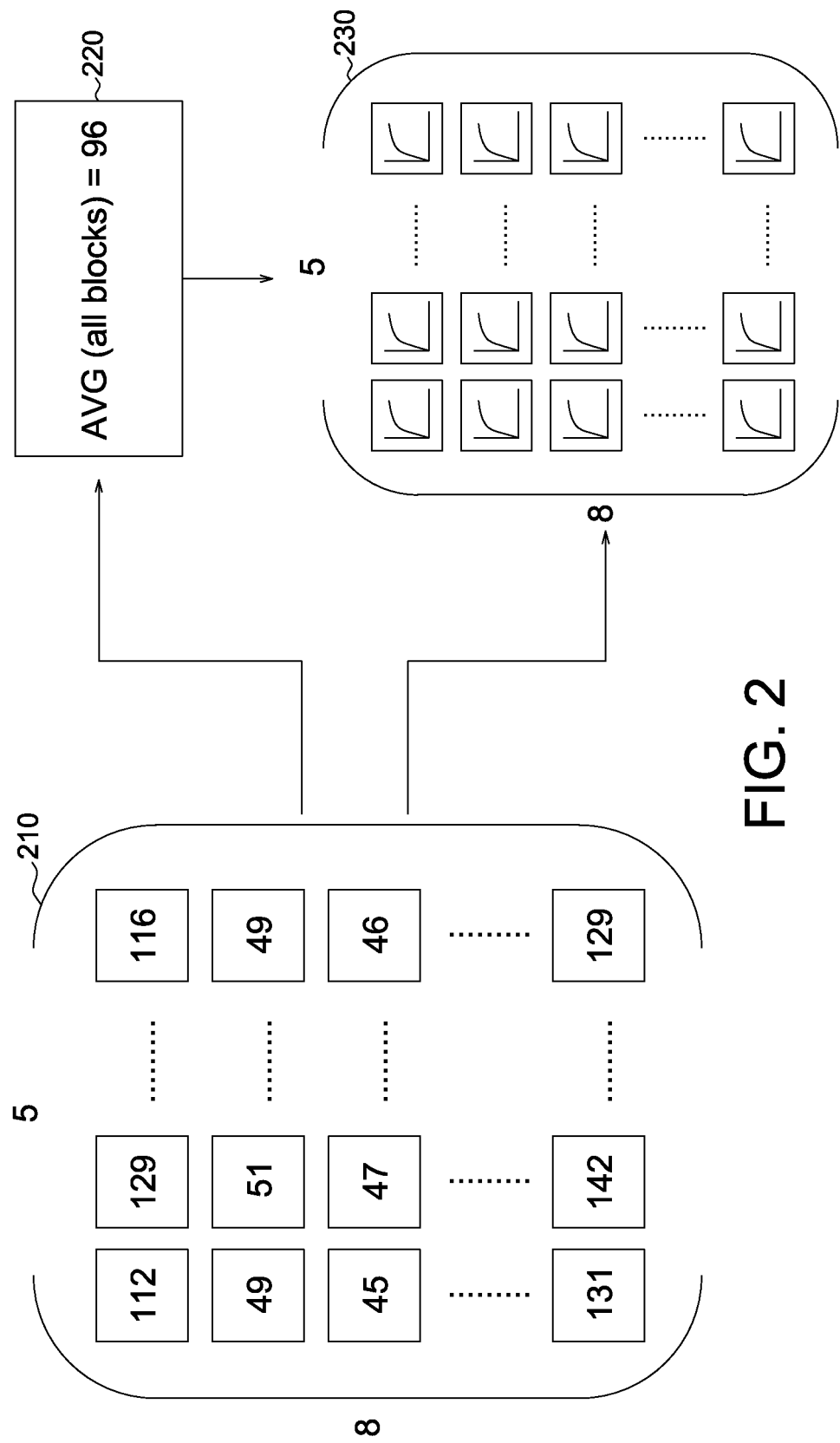
FIG. 2 and FIG. 3 are two examples for generating regional characteristic values and a global characteristic value according to an embodiment of the present disclosure.

FIG. 2 illustrates how regional characteristic values and a global characteristic value are generated according to an embodiment of the present disclosure. For illustration purposes, an input frame IN having a resolution of 640*1136 is taken as an example. It is understood that the present disclosure is not limited to the above example.

After the input frame IN having a 640*1136 resolution is received by the image content divider 110, for example, it is assumed that the image content divider 110 divides the input frame IN into 5×8 image regions. That is, one image region includes 128*142 pixels. The regional content analyzer 120 then calculates an average value of the brightness (Y) of each of the image regions as the first regional characteristic values, which are shown as the first regional characteristic values 210 respectively corresponding to the image regions in FIG. 2. For example, the first regional characteristic value 210 of the first image region (i.e., the average brightness value of the first image region) is 112.

The image content analyzer 130 obtains the global characteristic value according to the first regional characteristic values of the image regions calculated by the region content analyzer 120. For example, the image content analyzer 130 multiplies all of the first regional characteristic values by the same weighting (i.e. a weighting calculation), and obtains an average of the weighting result to obtain a global characteristic value 220. For example, in FIG. 2, the global characteristic value is 96.

Further, the image content analyzer 130 obtains the backlight control index corresponding to the global characteristic value through a look-up table, and provides the backlight control index to the dynamic backlight controller 150.

Further, the global/regional image processor 140 combines the respective first regional characteristic values and the global characteristic value into respective second regional characteristic values 230. For example, through a look-up table, the global/regional image processor 140 obtains a brightness adjustment value corresponding to the global characteristic value, and accordingly adjusts the brightness of the image regions. For example, if the global characteristic value is 96 and the average brightness of the first image regions is 112, through a look-up table, it is known that the brightness of the first image regions are to be adjusted to 110% of the original brightness. Then, the global/regional image processor 140 adjusts the brightness of the first image regions to 110%. Further, the brightness adjustment values of each of the image regions may be different, and may be determined according to the global characteristic value and the original average brightness of the image regions.

In FIG. 2, the small diagrams in the second regional characteristic values 230 represent a relationship between the brightness of each of the image regions before and after adjustment.

Figure 3:
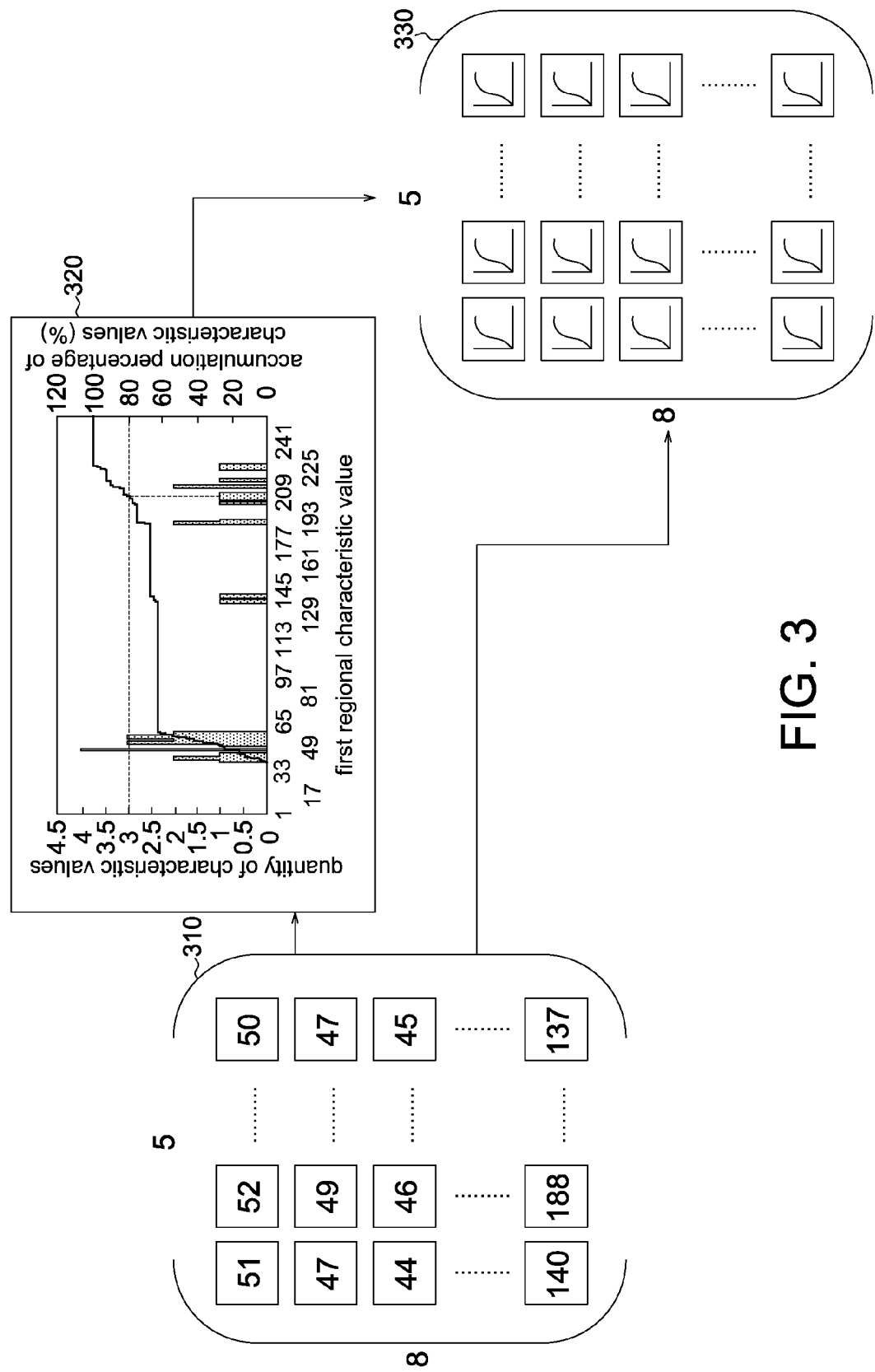

Another example of how the first regional characteristic values, the global characteristic value and the second regional characteristic values are obtained is described with reference to FIG. 3. Similarly, assume that the input frame IN is divided into 5×8 image regions.

For each of the image regions, the regional content analyzer 120 calculates respective max(RGB) values of all the pixels in the image region, and obtains a median value of these max(RGB) values as a first regional characteristic value 310. The max(RGB) value represents a maximum among sub-pixels R, G and B of one pixel. For example, as shown in FIG. 3, the first regional characteristic value 310 of the first image region is 51. The image content analyzer 130 arranges the median values of the image regions into a histogram, as shown by the middle part of FIG. 3. In the histogram, the horizontal axis represents the first regional characteristic values, the left vertical axis represents the quantity of the first characteristic values, and the right vertical axis represents an accumulation percentage of the first regional characteristic values. According to a predetermined accumulated percentage (e.g., 80%), a corresponding first regional characteristic value may be obtained, which may be set as the global characteristic value. Taking FIG. 3 for example, the first regional characteristic value corresponding to the accumulated percentage 80% is 209, meaning that a global characteristic value 320 is 209.

The first regional characteristic values and the global characteristic value are provided to the global/regional image processor 140. The global/regional image processor 140 combines the respective first regional characteristic values with the global characteristic value to obtain respective second regional characteristic values 330 corresponding to the image regions. For example, through a look-up table, the global/regional image processor 140 obtains the respective second regional characteristic values 330 corresponding to the image regions according to the global characteristic value and the respective first regional characteristic values 310. That is, adjustment on each of the first regional characteristic values of the image regions may be not the same. In FIG. 3, the small diagrams in the second regional characteristic values 330 represent a relationship between the contrast of each of the image regions before and after adjustment.

If the global characteristic value is 209, it means that the overall brightness of the input frame is sufficient. If the first regional characteristic value of the first image region is 59, it means that the brightness of the first image region is sufficient. Thus, adjustment on the first region characteristic value may be not large, so as to prevent from over-adjusting the brightness or the contrast of the image region already having a sufficient brightness. Conversely, if the first regional characteristic value of an image region is 188, it means that the brightness of the image region is rather low, and the first regional characteristic value of the image region is adjusted by a greater adjustment value to improve the contrast or the brightness of the image region. Thus, the contrast of the image may be adjusted.

Through a look-up table, the image content analyzer 130 may obtain the backlight control index according to the global characteristic value and send to the dynamic backlight controller 150 for the backlight control.

It should be noted that, the above two examples for obtaining the global/regional characteristic values may be combined in an alternative embodiment of the present disclosure, and such modification is also within the spirit of the present disclosure. That is to say, the first regional characteristic value includes at least one statistical value obtained according to at least one of brightness information and pixel data of the corresponding image region.

Although examples of adjusting the brightness and the contrast of the image regions are given in the above description, it is to be noted that the present disclosure is not limited to such examples. In other possible embodiments of the present disclosure, the colors, sharpness and saturation may also be adjusted by the above implementation.

Figure 4:
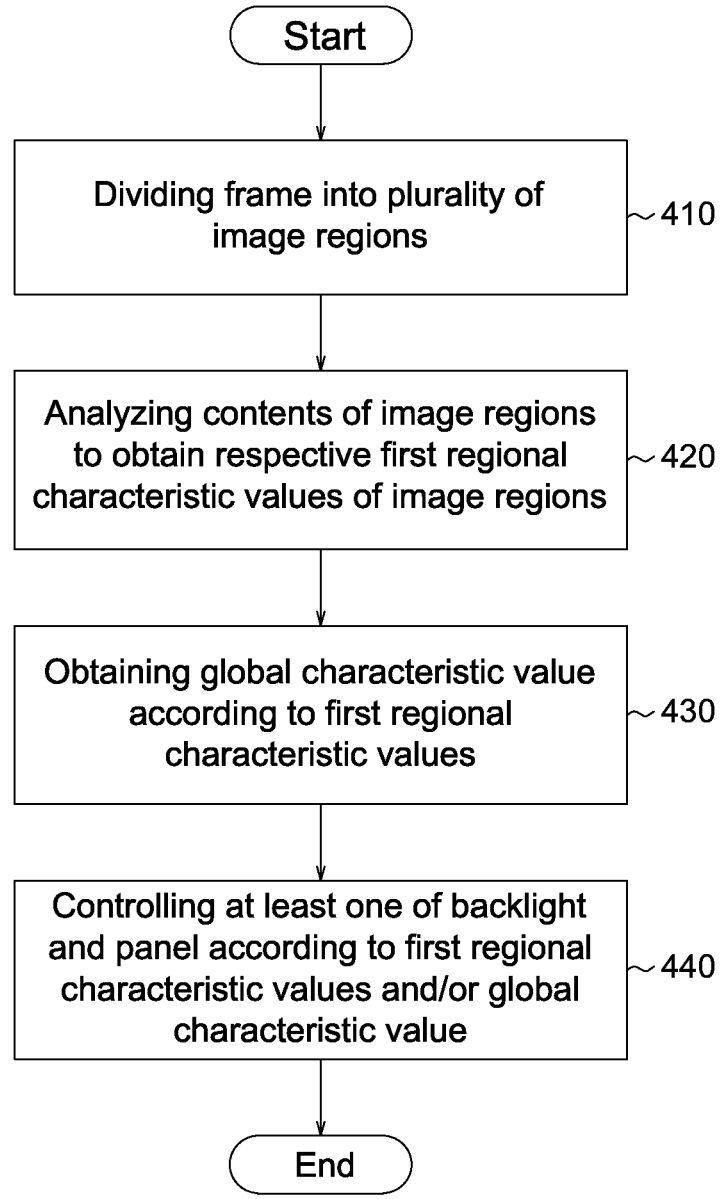
FIG. 4 is an image processing method according to another embodiment of the present disclosure.

FIG. 4 shows an image processing method according to another embodiment of the present disclosure. Referring to FIG. 4, the image processing method includes the following steps. In step 410, a frame is divided into a plurality of image regions. For example, step 410 is performed by the image content divider 110 according to the details in the associated description above. In step 420, contents of the image regions are analyzed to obtain respective first regional characteristic values of the image regions. For example, step 420 is performed by the regional content analyzer 120 according to the details in the associated description above. In step 430, a global characteristic value is obtained according to the first regional characteristic values of the image regions. For example, step 430 is performed by the image content analyzer 130 according to the details in the associated description above. In step 440, at least one of a backlight and a panel is controlled according to the first regional characteristic values and/or the global characteristic value. For example, step 440 is performed by the global/regional image processor 140 and the dynamic backlight controller 150 according to the details in the associated description above.

In the above embodiments of the present disclosure, the regional characteristic values corresponding to the image regions obtained by the regional content analyzer 120 may be applied for both image processing and backlight brightness control. Therefore, repeated computations are not required and thus the computation efficiency is effectively enhanced.

It is concluded from the above description that, in the embodiments of the present disclosure, respective characteristic values of the image regions are calculated, and the image content analyzer 130 may obtain the backlight control index to thereby control the backlight brightness of the backlight module 160. The global/regional image processor 140 may utilize the regional characteristic values of the image regions to obtain the global characteristic value, and the panel may be accordingly controlled to display the processed frame. Thus, the embodiments of the present disclosure may achieve both power-saving and display quality optimization while also preventing reduced efficiency caused by repeated computations.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
   dividing a frame into a plurality of image regions, each of the image regions comprising a plurality of respective pixels;
   analyzing respective contents of the image regions to obtain a plurality of values as respective first regional characteristic values of the image regions, wherein each of the first regional characteristic values of each image region is based on the respective pixels in the image region; and
   analyzing contents of the frame according to the first regional characteristic values to respectively control a backlight and a panel based on at least one result obtained in the step of analyzing contents of the frame,
   wherein the step of analyzing contents of the frame comprises: performing calculation on the first regional characteristic values of the image regions to obtain a single value as a global characteristic value, the global characteristic value being related to the whole frame; and
   wherein the step of controlling the backlight and the panel according to the at least one result comprises: controlling at least one of the backlight and the panel according to the first regional characteristic values and/or the global characteristic value.

2. The image processing method according to claim 1, wherein the step of controlling at least one of the backlight and the panel according to the first regional characteristic values and/or the global characteristic value comprises:
performing image processing on the frame according to the first regional characteristic values and/or the global characteristic value, to control display of the panel.

3. The image processing method according to claim 2, wherein the step of controlling at least one of the backlight and the panel according to the first regional characteristic values and/or the global characteristic value further comprises:
obtaining a backlight control index according to the global characteristic value to dynamically control the backlight.

4. The image processing method according to claim 1, wherein the step of controlling at least one of the backlight and the panel according to the first regional characteristic values and/or the global characteristic value comprises:
obtaining a backlight control index according to the global characteristic value to dynamically control the backlight.

5. The image processing method according to claim 2, further comprising:
combining each of the first regional characteristic values with the global characteristic value to obtain a plurality of respective second regional characteristic values corresponding to the image regions; and
wherein, the step of performing image processing on the frame according to the first regional characteristic values and/or the global characteristic value to control the panel to display the image comprises:
performing image processing on the frame according to the second regional characteristic values and/or the global characteristic value to control display of the panel.

6. The image processing method according to claim 2, wherein the step of performing image processing on the frame according to the first regional characteristic values and/or the global characteristic value comprises:
performing regional image processing on the respective image regions of the frame according to the respective first regional characteristic values; and
performing global image processing on the frame according to the global characteristic value.

7. The image processing method according to claim 1, wherein the first regional characteristic value comprises at least one statistical value obtained according to at least one of a brightness information and a pixel data of the image region.

8. The image processing method according to claim 1, wherein the step of analyzing the contents of the image regions to obtain the respective first regional characteristic values of the image regions comprises:
calculating respective average brightness of the image regions as the first regional characteristic values.

9. The image processing method according to claim 8, wherein the step of obtaining the global characteristic value according to the first regional characteristic values of the image regions comprises:
performing a weighting calculation on the first regional characteristic values to obtain the global characteristic value.

10. The image processing method according to claim 1, wherein the step of analyzing the contents of the image regions to obtain the respective first regional characteristic values of the image regions comprises:
calculating respective statistical values of pixel data of the image regions as the first regional characteristic values.

11. The image processing method according to claim 10, wherein the step of obtaining the global characteristic value according to the first regional characteristic values of the image regions comprises:
obtaining the global characteristic value according to a predetermined ratio and the first regional characteristic values.

12. An image processing device, comprising:
an image content divider, for dividing a frame into a plurality of image regions, each of the image regions comprising a plurality of respective pixels;
a regional content analyzer, for analyzing respective contents of the image regions to obtain a plurality of values as respective first regional characteristic values of the image regions wherein each of the first regional characteristic values of each image region is based on the respective pixels in the image region; and
an image content analyzer, for analyzing contents of the frame according to the first regional characteristic values to respectively control a backlight and a panel based on at least one result obtained by the regional content analyzer, and for performing calculation on the first regional characteristic values of the image regions to obtain a single value as a global characteristic value, the global characteristic value being related to the whole frame;
wherein, the image processing device controls at least one of the backlight and the panel according to the first regional characteristic values and/or the global characteristic value.

13. The image processing device according to claim 12, further comprising:
an image processor, for performing image processing on the frame according to the first regional characteristic values and/or the global characteristic value, to control display of the panel.

14. The image processing device according to claim 13, further comprising:
a dynamic backlight controller;
wherein, the image content analyzer obtains a backlight control index according to the global characteristic value, and the dynamic backlight controller dynamically controls the backlight according to the backlight control index.

15. The image processing device according to claim 12, further comprising:
a dynamic backlight controller;
wherein, the image content analyzer obtains a backlight control index according to the global characteristic value, and the dynamic backlight controller dynamically controls the backlight according to the backlight control index.

16. The image processing device according to claim 13, wherein:
the image processor combines each of the respective first regional characteristic values with the global characteristic value to obtain a plurality of respective second regional characteristic values corresponding to the image regions; and
the image processor performs image processing on the frame according to the first regional characteristic values and/or the global characteristic value to control display of the panel.

17. The image processing device according to claim 13, wherein:

the image processor performs regional image processing on the respective image regions of the frame according to the respective first regional characteristic values; and the image processor performs global image processing on the frame according to the global characteristic value.

18. The image processing device according to claim 12, wherein the first regional characteristic value comprises at least one statistical value obtained according to at least one of a brightness information and a pixel data of the image region.

19. The image processing device according to claim 12, wherein the regional content analyzer calculates respective average brightness of the image regions as the first regional characteristic values.

20. The image processing device according to claim 19, wherein the image content analyzer performs a weighting calculation on the first regional characteristic values to obtain the global characteristic value.

21. The image processing device according to claim 12, wherein the regional content analyzer calculates respective statistical values of pixel data of the image regions as the first regional characteristic values.

22. The image processing device according to claim 21, wherein the image content analyzer obtains the global characteristic value according to a predetermined ratio and the first regional characteristic values.

23. The image processing method according to claim 1, wherein
a global image processing is performed on the whole frame according to the global characteristic value, and
each of the image regions is adjusted based on the global characteristic value and each of the respective first regional characteristic values of the image regions.

24. The image processing device according to claim 12, wherein
a global image processing is performed on the whole frame according to the global characteristic value, and
each of the image regions is adjusted based on the global characteristic value and each of the respective first regional characteristic values of the image regions.

25. The image processing method according to claim 1, wherein
the step of analyzing contents of the frame is performed further to obtain a backlight control index; and
the step of controlling the at least one of the backlight and the panel according to the first regional characteristic values and/or the global characteristic value comprises:
adjusting image data of the frame for driving the panel according to either or both of the first regional characteristic values and the global characteristic value; and
controlling the backlight according to the backlight control index.

26. The image processing device according to claim 12, wherein
the image content analyzer analyzes the contents of the frame to obtain a backlight control index;
image data of the frame for driving the panel is adjusted according to either or both of the first regional characteristic values and/or the global characteristic value; and
the backlight is controlled according to the backlight control index.

27. An image processing method, comprising:
dividing a frame into a plurality of image regions;
analyzing respective contents of the image regions to obtain a plurality of values as respective first regional characteristic values of the image regions;
analyzing contents of the frame to obtain a global characteristic value and a backlight control index according to the first regional characteristic values, wherein the step of analyzing the contents of the frame to obtain the global characteristic value comprises: performing calculation on the first regional characteristic values of the image regions to obtain a single value as the global characteristic value, the global characteristic value being related to the whole frame;
adjusting image data of the frame for controlling a panel according to the first regional characteristic values and/or the global characteristic value; and
controlling a backlight according to the backlight control index.

28. An image processing device, comprising:
an image content divider, for dividing a frame into a plurality of image regions;
a regional content analyzer, for analyzing respective contents of the image regions to obtain a plurality of values as respective first regional characteristic values of the image regions; and
an image content analyzer, for analyzing contents of the frame to obtain a global characteristic value and a backlight control index according to the first regional characteristic values,
wherein
the image content analyzer performs calculation on the first regional characteristic values of the image regions to obtain a single value as the global characteristic value, the global characteristic value being related to the whole frame;
image data of the frame for controlling a panel is adjusted according to the first regional characteristic values and/or the global characteristic value; and
a backlight is controlled according to the backlight control index.

* * * * *